A. E. COOK & T. VAN TUYL.
PLOWING TRACTOR.
APPLICATION FILED APR. 13, 1914.
1,213,842.
Patented Jan. 30, 1917.
8 SHEETS—SHEET 1.
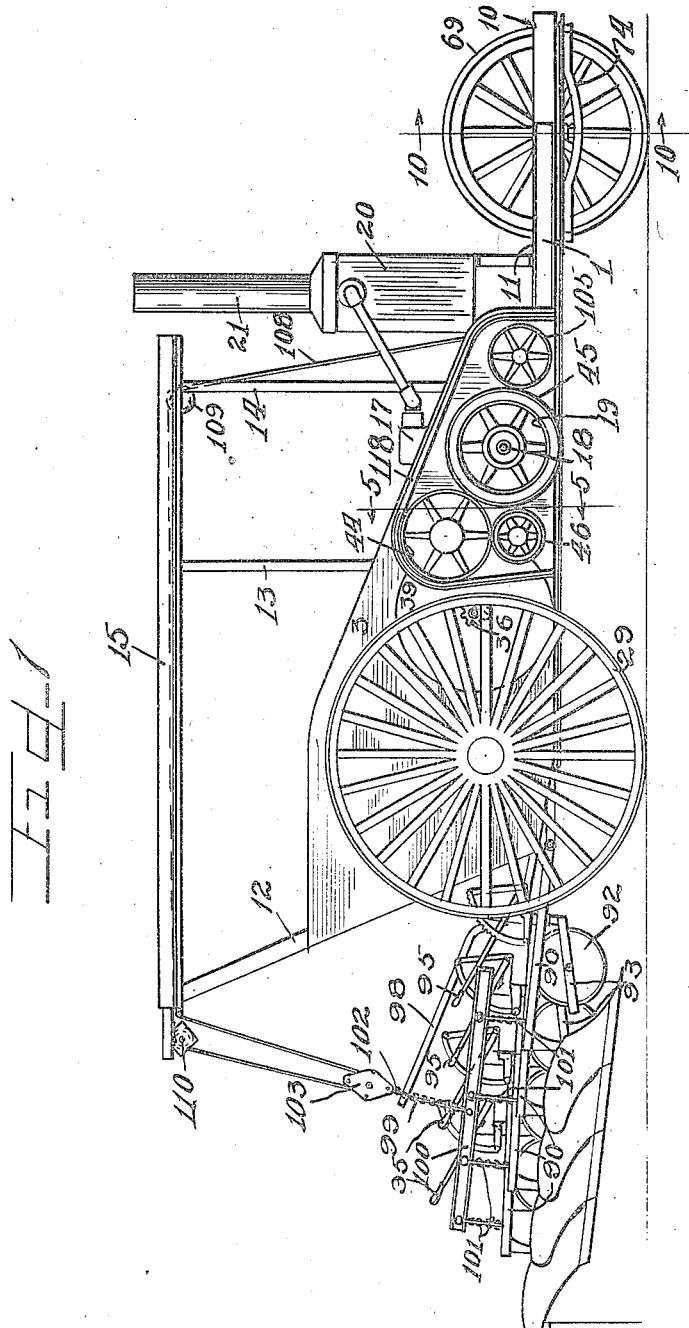

A. E. COOK & T. VAN TUYL.
PLOWING TRACTOR.
APPLICATION FILED APR. 13, 1914.
1,213,842.
Patented Jan. 30, 1917.
8 SHEETS—SHEET 2.
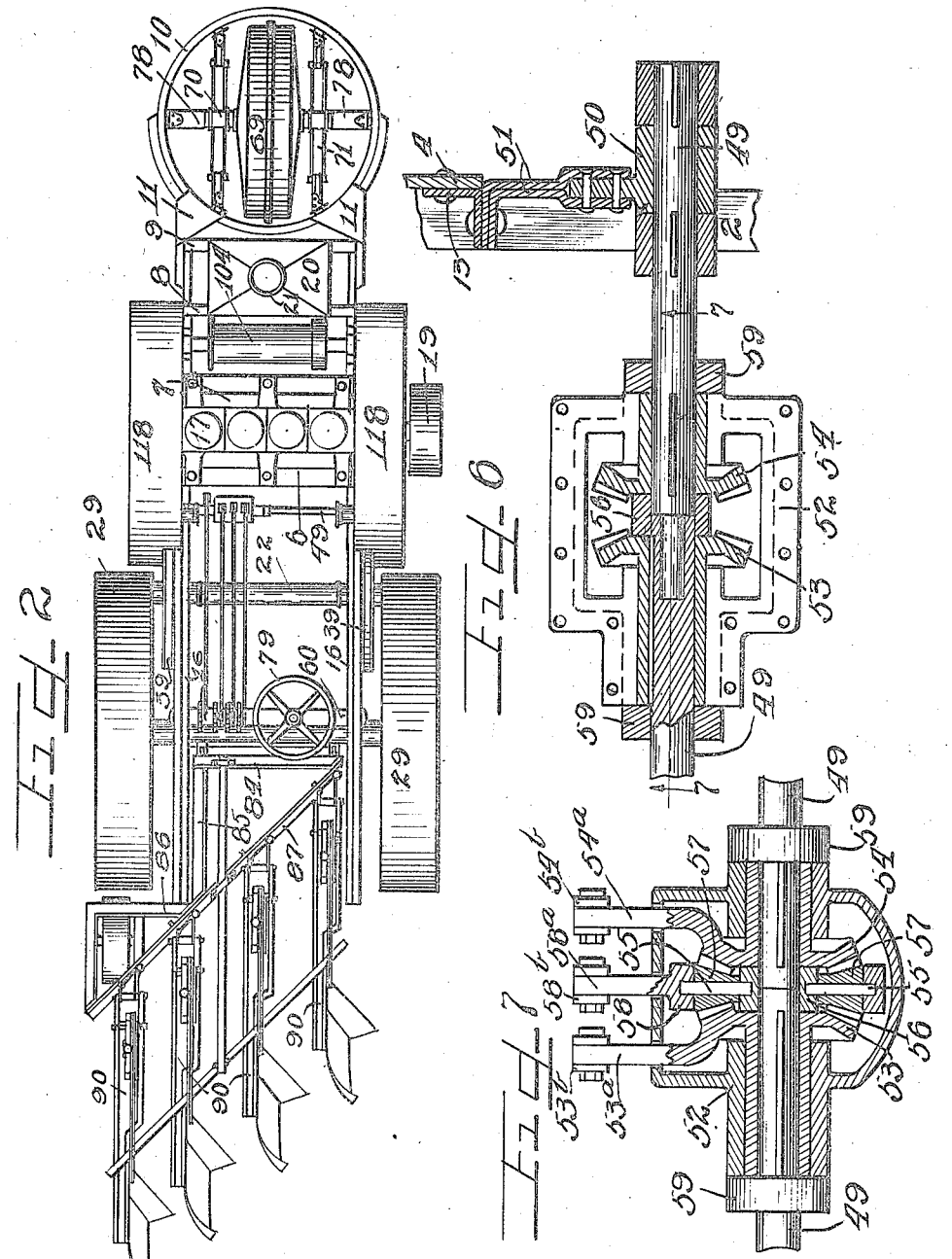

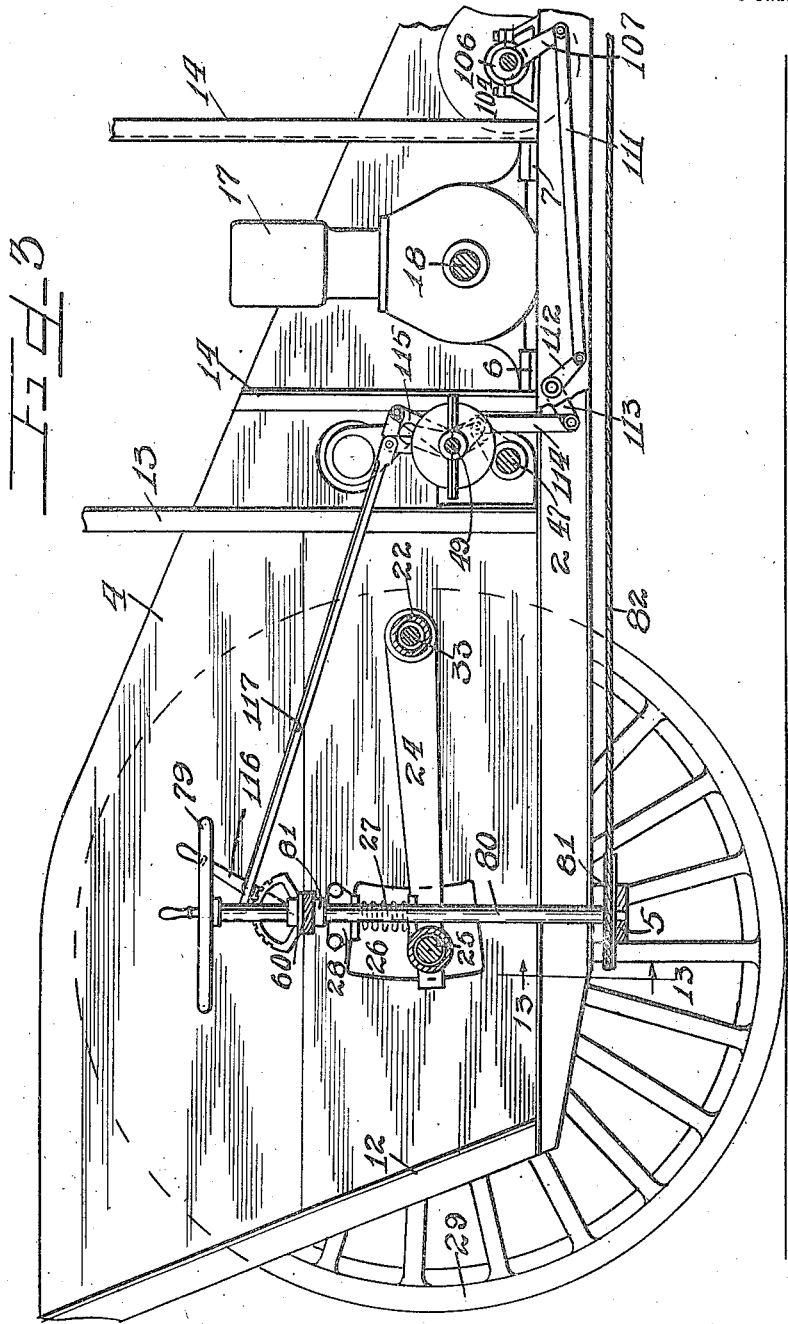

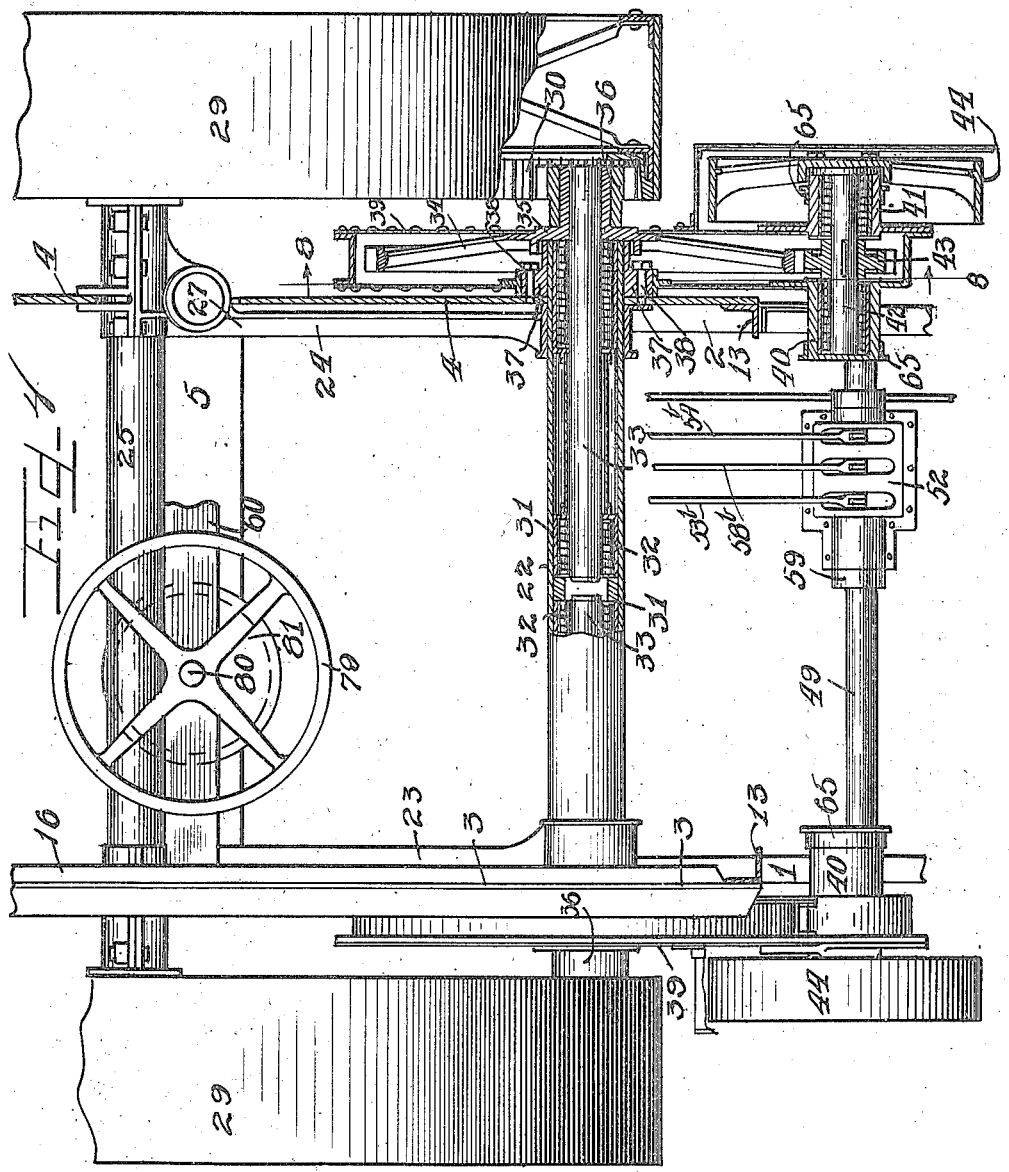

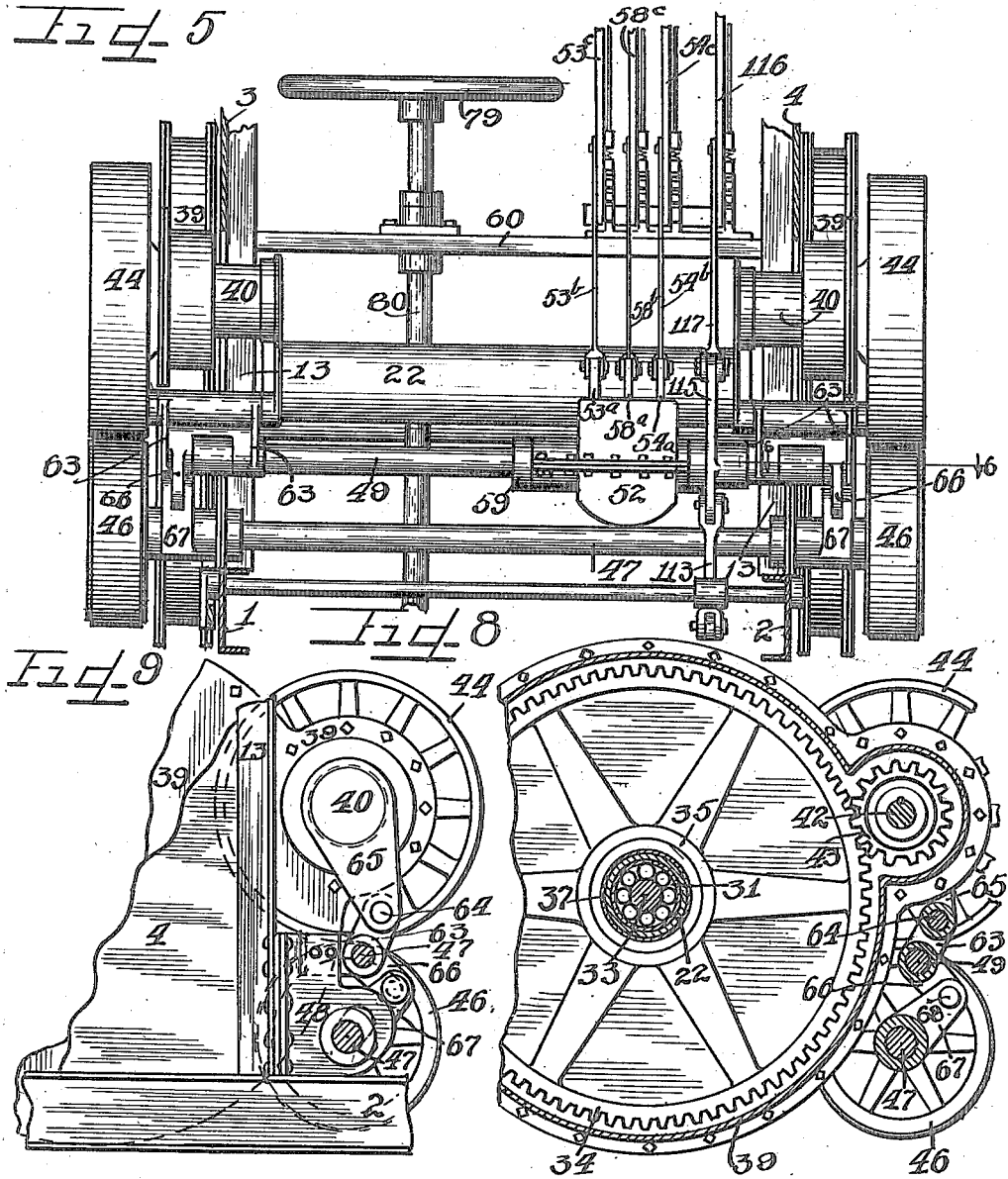
A. E. COOK & T. VAN TUYL.
PLOWING TRACTOR.
APPLICATION FILED APR. 13, 1914.
1,213,842.
Patented Jan. 30, 1917.
8 SHEETS—SHEET 5.

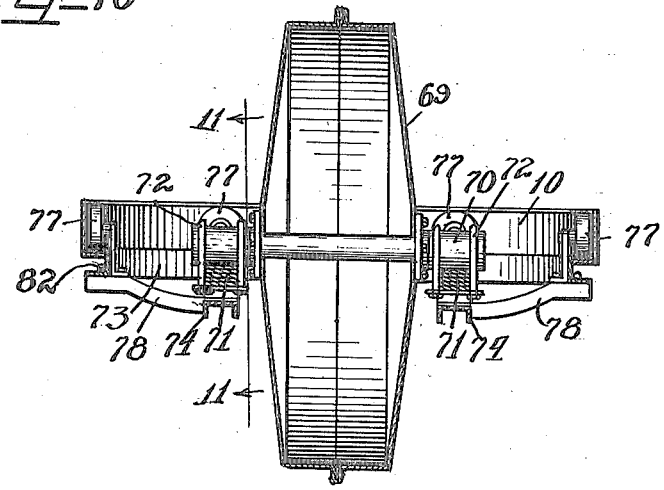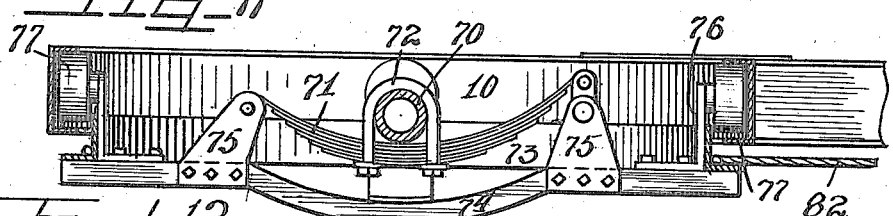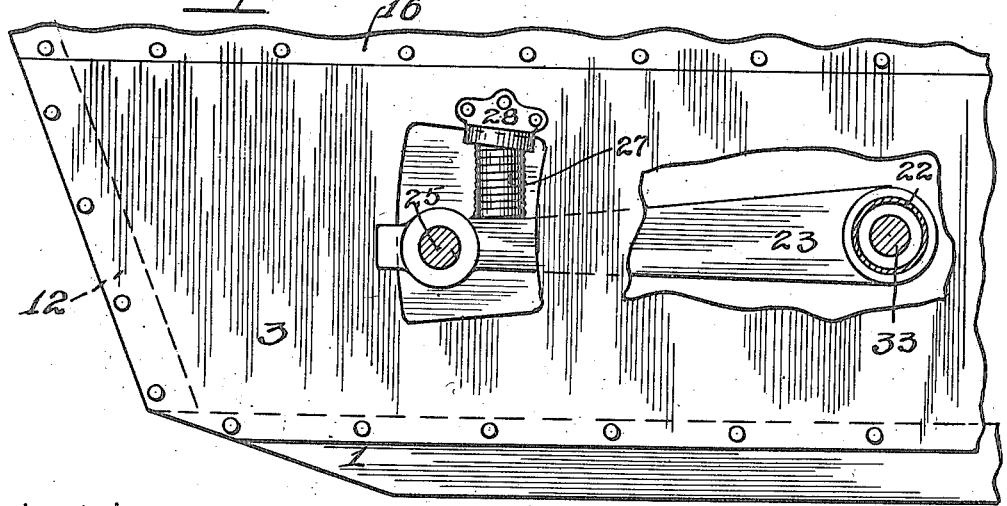

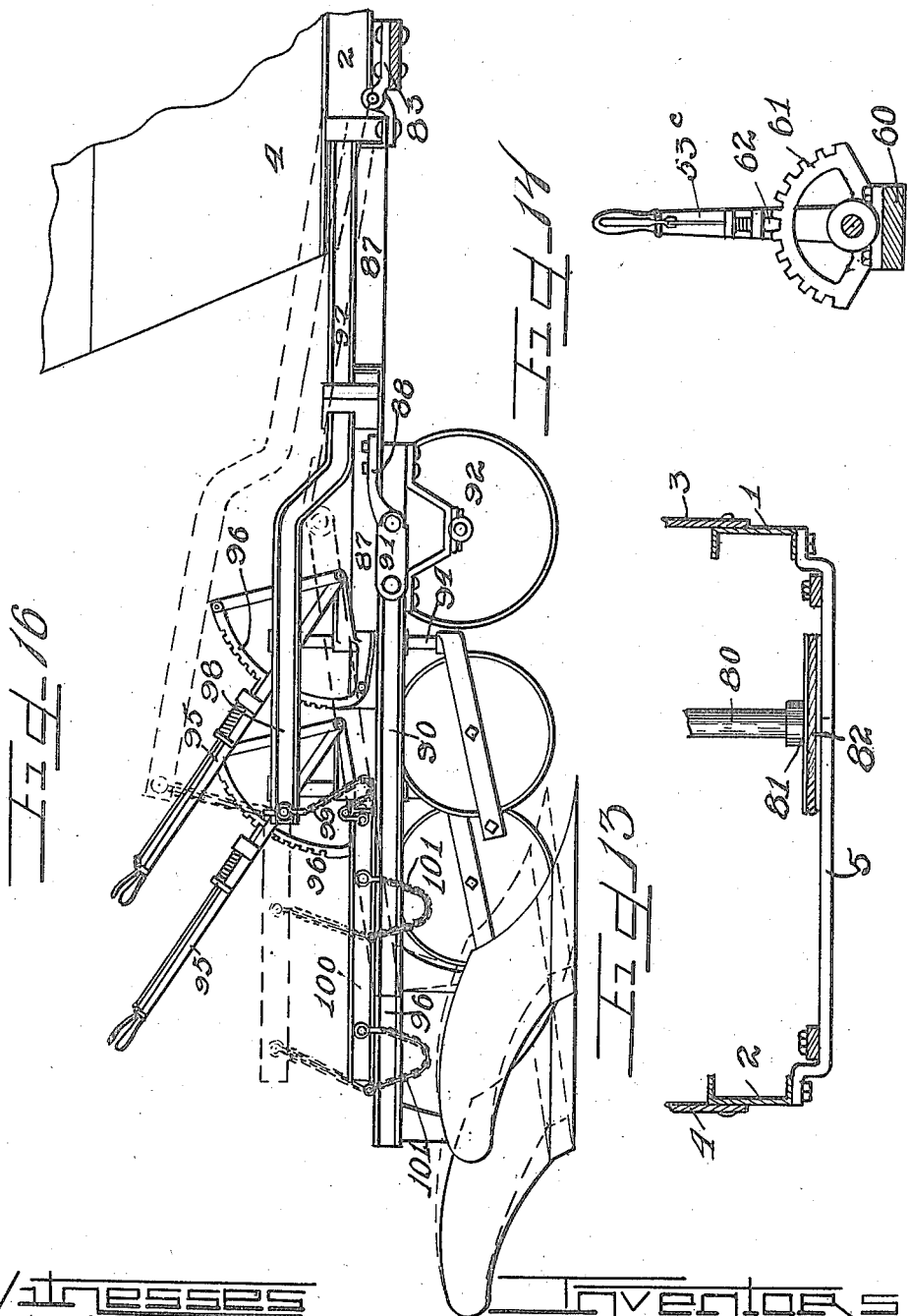

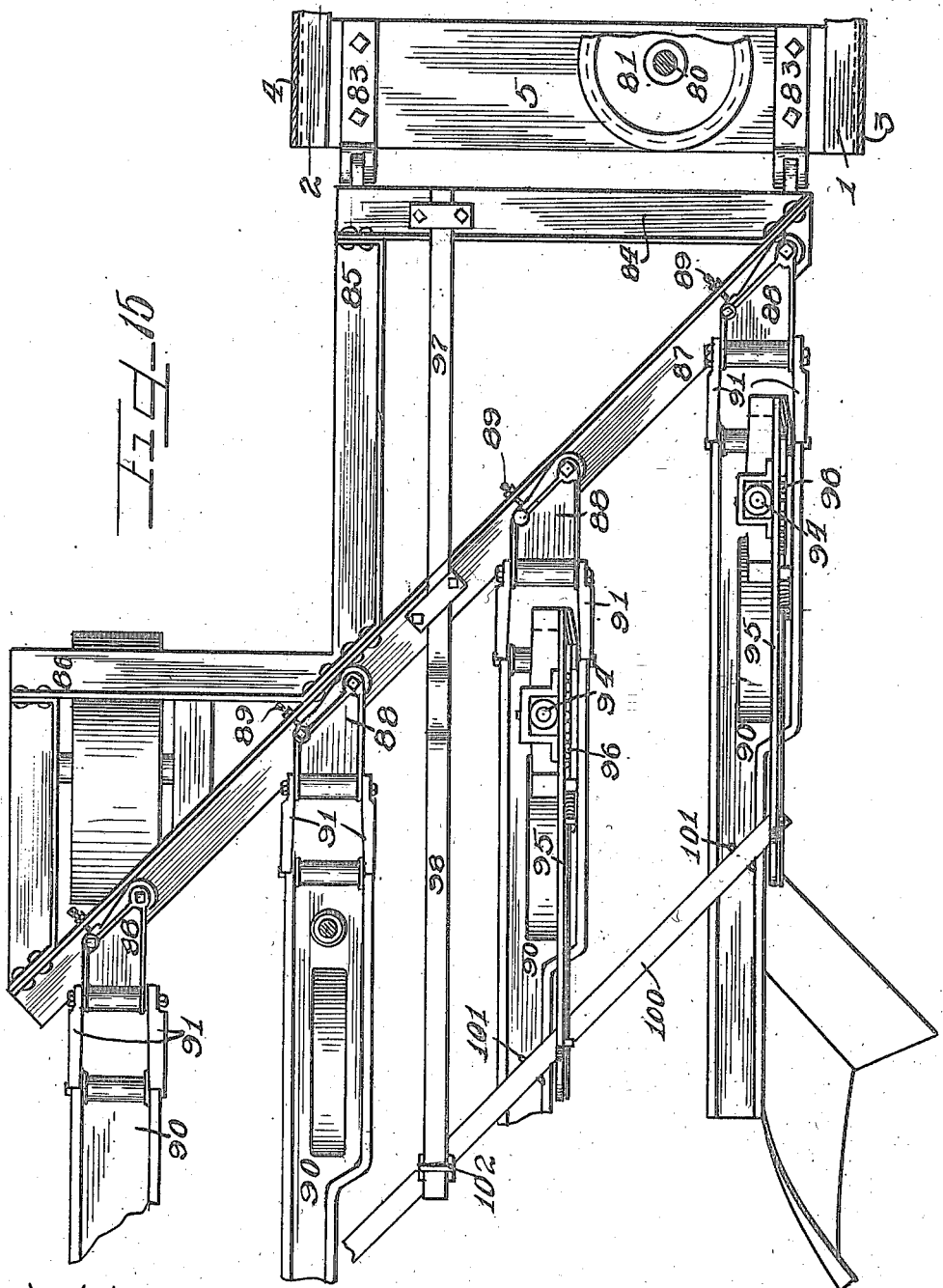

UNITED STATES PATENT OFFICE.

ALBERT E. COOK AND THOMAS VAN TUYL, OF KANKAKEE, ILLINOIS; SAID VAN TUYL ASSIGNOR TO SAID COOK.

PLOWING-TRACTOR.

1,213,842.  Specification of Letters Patent.  Patented Jan. 30, 1917.

Application filed April 13, 1914. Serial No. 831,625.

*To all whom it may concern:*

Be it known that we, ALBERT E. COOK and THOMAS VAN TUYL, citizens of the United States, and residents of the city of Kankakee, in the county of Kankakee and State of Illinois, have invented certain new and useful Improvements in Plowing-Tractors; and we do hereby declare that the following is a full, clear, and exact description of the same, reference being had to the accompanying drawings, and to the numerals of reference marked thereon, which form a part of this specification.

With the widespread development of scientific farming, the old and crude hand operated team drawn plows and other agricultural machinery have given place to the more modern power-driven machines which are capable of performing the work hitherto requiring the services of a large number of men and teams.

This invention relates to a powerful gasolene tractor capable of hauling a gang of plows, as well as adapted to many other useful purposes where power is required on and about a farm. Gasolene tractors for hauling have been used to some extent, but generally difficulty is experienced in coupling the gangs of plows or other agricultural implements to the tractor in a manner permitting practical operation of the plows, for instance to maintain a straight furrow across the field. However, by this invention means are provided for coupling a gang of plows directly to the tractor frame, thus insuring proper alinement of the plows with the tractor during operation at all times and preventing the plows from being directed out of their proper course by obstructions, and furthermore, with the mechanisms disposed convenient the operator for manipulation to properly gage the depth and other characteristics of the furrows.

It is an object of this invention to construct a plowing tractor capable of either forward or reverse movement by the simple manipulation of levers for the purpose to rearrange friction driving mechanism by which the device is propelled, and with mechanism for supporting a gang of plows either elevated entirely clear of the ground or lowered to cut a furrow.

It is also an object of this invention to provide a powerful tractor for hauling or plowing, wherein a direct positive drive is provided for the large rear tractor wheels, the axle on which the same are journaled being pivotally connected to the tractor frame and engaged by a suitable spring construction to relieve the tractor frame and mechanisms mounted thereon from severe shocks when uneven ground or obstructions are met with.

It is also an object of this invention to construct a tractor wherein the frame is supported through spring suspensions on the tractor wheels both front and rear, and wherein the driving mechanisms are so connected to the rear tractor wheels as to permit relative movement thereof with respect to the frame without interference with the driving mechanisms.

It is also an object of this invention to construct in combination with a tractor, a gang of plows pivotally connected directly to the tractor frame, and with means for supporting the rear of the gang of plows from an elevated portion of the tractor frame to suspend the plows above and out of contact with the ground when desired.

It is also an object of our invention to construct a device wherein the weight of the power plant and driving mechanism are disposed on one side of the main supporting wheels of the device and the heavy gangs of plows are supported on the other side thereof to increase the traction effect and stability of the tractor.

It is also an object of this invention to provide a tractor adapted to carry a gang of plows either in plowing position or elevated above the ground and with a power plant and mechanism connecting the same to drive the driving wheels of the tractor in a manner whereby the drive may be communicated to each of the rear driving wheels either to only one thereof, or to both thereof independently of one another to permit differential movement therebetween.

It is furthermore an object of this invention to construct a high powered gasolene tractor wherein the drive from the power plant may be communicated directly to the rear driving wheels through independently operating mechanisms for each of the wheels, and with means for actuating said mechanisms either simultaneously with one another to equalize the drive to said driving wheels or to operate each one separately for forward or reverse driving.

It is finally an object of this invention to construct a powerful machine capable of easy operation by manipulation of only a few levers, and with the tractor frame mounted on a spring suspension to insure easy riding qualities and obviate shocks to the mechanisms mounted thereon.

The invention (in a preferred form) is illustrated in the drawings and hereinafter more fully described.

On the drawings: Figure 1 is a side elevation of a plowing tractor with the plows elevated out of contact with the ground. Fig. 2 is a top plan view thereof. Fig. 3 is a fragmentary interior view of the device with one wall and wheel removed. Fig. 4 is a fragmentary top plan view of the rear end of the device, with parts shown in section and parts in elevation. Fig. 5 is a fragmentary section taken on line 5—5 of Fig. 1, with parts omitted. Fig. 6 is a fragmentary section taken on line 6—6 of Fig. 5, with parts omitted. Fig. 7 is a section taken on line 7—7 of Fig. 6. Fig. 8 is a fragmentary section taken through the rotatable casing on line 8—8 of Fig. 4. Fig. 9 is a similar view in elevation. Fig. 10 is a section on line 10—10 of Fig. 1. Fig. 11 is a section on line 11—11 of Fig. 10. Fig. 12 is a fragmentary view partly broken away showing the pivotal connection and spring suspension of the tractor body upon the rear axle thereof. Fig. 13 is a fragmentary section taken on line 13—13 of Fig. 3. Fig. 14 is a side elevation of one of the actuating levers, all of which are similarly constructed. Fig. 15 is a fragmentary top plan view with parts omitted of the gang of plows mounted at the rear of the tractor. Fig. 16 is a side elevation thereof.

As shown in the drawings, the tractor frame comprises the longitudinal channel side sills 1 and 2, and riveted respectively thereto and extending upwardly therefrom in substantially a vertical plane, are sheet metal walls 3 and 4. Said sills 1 and 2, at their rear ends, are connected by a transverse beam 5, and similarly, beams 6, 7, 8 and 9, the latter disposed at the forward end of said channel sills, serve to rigidly connect the same together. A circular channel truck frame 10, forms a part of said tractor frame and is rigidly connected to the forward ends of the side channel sills 1 and 2, by means of heavy bracket members 11. Extending upwardly and rearwardly on each side of the tractor frame from the rear end of the sills are inclined angle bar uprights 12, and, together with vertical angle iron standards 13 and 14, they serve to support a strong roof structure 15, which not only protects the mechanism of the tractor from the weather, but also provides a means whereby the gang plows hereinafter described may be elevated out of contact with the ground.

Horizontal longitudinal members 16, extend between the diagonal standards 12, and vertical standards 13, on each side of the machine, and are riveted, as are also the uprights 12, 13, and 14, to the respective sheet walls 3 and 4.

Mounted within the tractor frame and bolted to the transverse beams 6 and 7, is a four cylinder gasolene motor 17, the shaft 18, of which extends through suitable bearings on each side of the tractor and on one end is provided with a belt pulley 19, from which power may be taken off for use in any manner desired. A radiator 20, is mounted on the tractor frame on the transverse beams 8 and 9, and also associated therewith is an upwardly directed stack 21, the radiator acting to cool the circulating water for the engine and the stack to receive the exhaust and pass the same to the atmosphere remote from the machine.

A bearing sleeve 22, extends between and through the respective side walls 3 and 4, of the tractor, and journaled thereon and directed rearwardly are arms 23 and 24, respectively, which, at their ends, afford supports for a rear axle 25, of the tractor. A curved slot 26, is provided in each of the respective side walls 3 and 4, to permit movement of the axle relative the tractor frame about its pivot point of support, namely, the sleeve 22. The weight of the rear portion of the tractor frame is borne by said axle 25, through heavy spiral springs 27, which, at their upper ends, rest in brackets 28, and at their lower ends bear against said arms 23 and 24, respectively, at a point closely adjacent the bearings for said axle. Tractor wheels 29, are journaled on the extremities of said axle 25, on each side of the machine, and both are provided with an internal annular gear 30.

A plurality of cages 31, are contained within said sleeve 22, each forming a retaining and tracking means for rollers 32, and projecting into said sleeve 22, from each end thereof, are shaft sections denoted by the reference numeral 33, and each section rotates in certain of the roller bearings. Relatively large gears 34, with hubs 35, one each keyed upon the respective shaft sections 33, are mounted at the ends of said sleeve 22, and in each case a small pinion 36, is rigidly secured upon the hub 35, whereby a drive transmitted to said gear 34, is communicated to said pinion 36, which, meshing with the internal gear 30, on the tractor wheels, transmits the drive thereto. Collars 37, are shrunk upon the outer ends of said sleeve 22, serving to reinforce the same and bolts 38, are secured to said collars and to the respective side walls 3 and 4, of the tractor, to maintain the sleeves securely therein.

Journaled on said collar 37, and also upon the hub 35, of the gear 34, is an oscillatable casing 39, inclosing said gear 34. Bearing members 40 and 41, respectively, are rigidly secured on one side of said casing 39, and support therein journaled upon roller bearings, a shaft 42, centrally on which is keyed a pinion 43, meshing with the gear 34, at all times. On the outer end of said shaft 42, is rigidly secured a friction pulley or wheel 44. A friction wheel 45, is provided on each end of the engine shaft 18, and, when contacted by the friction wheel 44, serves to transmit the drive through the pinion 43, and gear 34, and thence through the pinion 36, to the internal gear of the tractor wheels, to rotate the latter. However, for the purpose of reversing the drive in order to enable the tractor to be driven rearwardly, a friction pulley 46, is journaled on a shaft 47, which is movable in a slot in a bracket 48, riveted to the angle upright 13, so that when said friction wheel 46, is moved into engagement with the friction wheel 45, it is also simultaneously moved into engagement with the friction wheel 44, so that the drive from the engine is communicated first through the friction wheel 45, to the friction wheel 46, and thence to the friction wheel 44, to be transmitted to the tractor wheel through the intermediate gears described. For the purpose of moving the shaft 47, in its slotted bearing support 48, sectional shafts 49, are provided, extending transversely of the machine, one for the friction mechanism on each side thereof, and each one is rotatably supported in a bearing 50, held by bracket members 51, secured to said upright 13, of the tractor frame. At their inner ends said shafts 49, are journaled in a casing 52, the end of one of said shafts being reduced in diameter and projecting rotatably within an axial aperture in the other shaft in order to insure alinement of said shafts at all times, and yet permit relative movement therebetween. Keyed upon each of said shaft sections within the casing, are beveled gear sectors 53 and 54, respectively, and mounted on studs 55, secured in a collar 56, between said gear segments, are bevel pinions 57, each engaging both of said gear sectors. An annular member or ring 58, is secured around said pinion 57, and receives the outer end of the studs 55, therein. Thus it is apparent that a differential movement is permitted between the respective gear sectors 53 and 54, but with movement of said ring 58, owing to the engagement of the pinion 57, with each of said segments 53 and 54, respectively, the latter are caused to move simultaneously with one another and in the same direction. Collars 59, are secured upon each of said shafts 49, closely adjacent the ends of the casing 52, to prevent longitudinal movement of said shafts. Integral upwardly directed arms 53$^a$, 54$^a$, and 58$^a$, are provided on said respective gear segments 53 and 54, and upon said annular member 58, said arms projecting through longitudinal slots in the upper portion of the casing 52. Links, denoted respectively as 53$^b$, 54$^b$, and 58$^b$, connect said arms with the respective levers 53$^c$, 54$^c$, and 58$^c$, which are mounted upon a transverse bar 60, extending between the side walls 3 and 4, of the tractor. Notched segments 61, adapted to coöperate with a releasable spring pressed detent 62, are provided for each of said levers in order to maintain the same in any desired adjusted position. Bell crank levers are rigidly secured on the ends of each of said shafts 49, and each is provided with an upwardly directed arm 63. A pintle member 64, is supported in said upwardly directed crank arm 63, and pivotally engaging said pintle 64, are the downwardly directed arms 65, which, at their upper ends, are journaled upon the bearing members 41 and 42, respectively, in the rotatable casing 39. With movement of said crank arms, the casing 39, is caused to rotate a slight amount, either to move the friction wheel 44, into or out of contact with the driving friction wheel 45, on the engine shaft. Said bell crank is also provided with a downwardly directed arm 66, to which is linked an upwardly directed arm 67, by means of a pintle 68, with said arm journaled upon the slidable shaft 47, moving in the slotted bracket member 48. Accordingly, when one of the shaft sections 49, is rotated, with a forward movement of the respective actuating lever therefor, the friction wheel 44, is moved downwardly through the connecting links and bell cranks already mentioned into contact with the driving wheel 45, and, due to the movement of the bell crank, said friction wheel 46, is impelled away out of contact with the friction wheel 44. When it is desired to reverse the tractor the proper actuating lever is pulled rearwardly, thus through the bell crank and connecting links mentioned, withdrawing the friction wheel 44, from contact with the friction wheel 45, and throwing the same into contact with said friction wheel 46, which is also in contact with the friction wheel 45.

The front end of the tractor is supported upon a steering wheel or roller 69, which is rotatable with an axle. A spring suspension for the axle is provided comprising a pair of elliptic leaf springs 71, one on each side of the wheel 69, with U-bolts 72, clipped at the central portion thereof and engaging over bearings 70, for said axle. A turntable 73, fits within said channel ring member 10, of the tractor frame, and upon longitudinal beams 74, is provided with upstanding brackets 75, which support the ends of said leaf springs 71. Also secured upon said beams 74, are brackets 76, which project upwardly therefrom and have journaled thereon rollers 77, which track upon the under surface of the upper flange of the channel ring frame 10, supporting the same thereon. Short downwardly directed bracket frame members 78, are also provided diametrically opposite one another on said turntable 73, reinforcing said beams 74, and also affording a means of attachment for similar supporting rollers 77, as already described.

For the purpose of turning the wheel to steer the tractor, a steering wheel 79, is mounted at the rear end of the tractor frame upon a vertical shaft 80, which extends through a bushing on the cross-bar 60, and at its lower end rests in a pivot bearing in the cross-beam 5, extending between the sills 1 and 2. A sheave 81, is rigidly secured on the lower end of said shaft 80, and wound therebout and around the angle iron ring of the turntable 73, is a cable 82, so that movement of the steering wheel 79, may be transmitted to the turntable by said cable to steer the tractor.

Bolted to the rear beam 5, of the tractor are brackets 83, and releasably pivoted thereto is a frame for a gang of plows comprising a transverse angle 84, a longitudinal angle 85, riveted thereto, a transverse angle 86, and a diagonal angle 87, all rigidly secured together. Pivoted to the diagonal angle frame member 87, are a number of short brackets 88, which, by means of an adjusting bolt 89, against which said bracket bears, may be held at different plowing angles with said diagonal as desired. The plows and plowing disks are mounted upon channel members, each denoted by the reference numeral 90, and a double link connection 91, affords a swinging pivotal mounting for said channels upon said short bracket members 88.

The disks 92, are supported in a usual manner comprising frame members 93, engaged on an upright 94, which may be raised or lowered by levers 95, held in adjusted position by a toothed segment 96, for the purpose. An I-beam extends longitudinally of the plow frame and at its forward portion, denoted by the reference numeral 97, it is attached to the transverse plow frame members 84 and 87, respectively, and its rear portion is offset and elevated, as denoted by the reference numeral 98, to receive attached thereto a chain 99. The other end of said chain is connected to a bar 100, which is entirely unconnected from the plow frame, but is connected to each of the respective channel plow supports 90, by means of chains 101. A shackle 102, is provided at the ends of the portion 98, of said I-beam to permit attachment thereto of a tackle block 103, for a purpose hereinafter pointed out. The object of mounting the diagonal beam 100, loosely connected with the plows and plow frame, is to permit elevation of the rear or outer end of the plow frame members 90, about the pivotal connecting links 91, before the plow frame proper is elevated, so that the nose of the respective plows may be withdrawn from the earth before the plows are lifted as a whole out of contact with the ground. Power driven means are provided for the purpose of elevating said plows and plow frame and holding the same in elevated position. This comprises a drum 104, mounted at the front end of the tractor frame between the motor and the radiator and it is provided at each of its shaft ends with a friction wheel 105. As clearly shown in Fig. 3, the shaft of said drum 104, is mounted in an eccentric bearing 106, provided with a downwardly directed arm 107, which, when actuated, serves to throw said friction wheels 105, into and out of engagement with the friction wheels 45, on the engine shaft, to rotate said drum. Wound about said drum and extending upwardly to the roof structure 15, is a cable 108, which is trained over sheaves 109 and 110, respectively, and thence leads through the block 103, with the end of the cable secured to the rear end of the roof structure, so that with rotation of said drum 104, the plows and plow frame may be raised or lowered, as desired. For the purpose of actuating said respective friction wheels into engagement to rotate the drum or to use the same as a brake in lowering the same, a connecting rod 111, at one of its ends is connected to said arm 107, and at its other end to the arm 112, of a bell crank pivoted on the interior of the tractor frame. The other arm 113, of said bell crank is connected by means of a link 114, with a downwardly directed arm of a bell crank pivoted upon one of the shaft sections 49. The other arm 115, of said bell crank is connected to a lever 116, by means of a long connecting bar 117, so that movement of said lever serves to throw the drum shaft toward and away from the engine shaft to engage or disengage the friction wheels on each respectively. A toothed segment is provided adjacent said lever 116, to permit locking the same in any adjusted position. A metal housing or sheathing 118, extends over the friction transmisson mechanism to protect the same on each side of the tractor.

The operation is as follows: The source of power for driving the tractor is of course the gasolene motor 17, and the tractor may be driven forwardly through the friction wheels 45 and 44, engaging one another, or reversely with the friction wheels 45 and 46 in engagement, and the latter in turn engaging the friction wheel 44. The movement of the friction wheels 44 and 46, to and from the main driving friction wheel 45, and to and from each other is effected by means of the link connection therebetween, the bell crank pivoted on the shaft 49, serving in one of its movements to throw said wheel 44, out of engagement with the wheel 45, and with a continued movement, to throw the wheel 46, into engagement with the wheel 45, and wheel 44, to effect a reverse drive. Inasmuch as the drive from the wheel 44, is communicated to the tractor wheels through the pinion 43, and gear 34, the casing 39, which supports the small pinion 43, is rotatably mounted to permit movement thereof as said friction wheel 44, is moved. The front of the tractor is supported upon the wheel 69, through the elliptic springs 71, so that the front of the tractor frame is relieved from shocks occasioned by unevenness in the road or ground over which the tractor is traveling.

The tractor frame is also resiliently supported upon the rear axle, on which the rear driving tractor wheels are journaled. Owing to the pivotal connection through the arms 23 and 24, of said axle with the frame, the movement of the axle relative the frame is through a small arc, the center of which is coincident with the axis of the driving pinions 36, which mesh with the internal gears within the tractor wheels, so that the small amount of relative movement of the tractor wheel upon its axle relative the frame does not impair or effect the driving connections. Inasmuch as a friction driving means is provided on each side of the tractor, one for each of the respective driving wheels 29, due to the connected mechanisms mounted on the respective shaft sections 49, said tractor wheels may be controlled independently of one another. That is to say, one tractor wheel may be driven forwardly and the other reversely, or by means of the single lever 58°, the two wheels may be driven simultaneously with the amount of adjustment of the respective friction mechanisms the same or different. This is due to the differential arrangement of the segment gears 53 and 54, with the ring 58, and pinions 57, whereby, by actuation of the right hand lever 53° forwardly, the right hand tractor wheel 29, will be driven forwardly, and with a reverse movement of the lever, said wheel will be reversed in its drive. Likewise the other tractor wheel is controlled by the lever 54°, in a similar manner. However, when it is desired to drive said tractor wheels simultaneously, assuming the levers 53° and 54°, to be in a neutral position, when the lever 58°, is moved forwardly, the respective friction driving mechanisms on each side of the tractor frame are thrown into engagement to drive both wheels forwardly, and when said lever is pulled rearwardly the respective friction members are so disposed with the wheels 46, engaging the driving wheels 44, and friction wheels 45, to reverse the drive through each of the tractor wheels in an equal and like amount.

It is obvious that the plows may be adjusted to any desired angle or to any desired depth of cut, dependent upon the adjustment of the levers 95, and the small adjusting bolts 89, which determine the angle at which the respective disks and plows are drawn over the ground.

We are aware that numerous details of construction may be varied through a wide range without departing from the principles of this invention, and we therefore do not purpose limiting the patent granted otherwise than necessitated by the prior art.

We claim as our invention:

1. In a tractor of the class described, a frame, a bearing sleeve mounted thereon, arms journaled on said sleeve, an axle supported at the ends of said arms, tractor wheels journaled on the ends of said axle, an internal annular gear on each of said tractor wheels, shafts journaled within said sleeve, and a pinion connected to each of said shafts adapted to mesh with said internal annular gears to drive the tractor wheels.

2. In a tractor of the class described, a frame, a sleeve mounted thereon, arms journaled thereon, an axle mounted in said arms, internally geared tractor wheels journaled on the ends of said axle, driving means within said sleeve, and pinions forming a part thereof meshing with said internally geared tractor wheels to drive the tractor.

3. In a tractor of the class described, a frame, means pivotally connected therewith, an axle mounted in said means, internally geared tractor wheels journaled on the ends of said axle, and mechanisms associated with said means adapted to mesh with said internally geared tractor wheels to drive the same.

4. In a device of the class described, a frame, a sleeve mounted thereon, friction driven means mounted within said sleeve, pinions secured thereon, arms journaled on said sleeve co-axial with said means, an axle mounted in the ends of said arms, resilient means connected on said arms to support said frame thereon, and annular internally geared tractor wheels on the ends of said axle meshing with said pinions to receive a drive from said friction driven means.

5. In a device of the class described, a frame, friction driven driving means connected therewith, arms having one end of each thereof pivoted co-axial with said means, springs connected between said frame and arms to support the frame on said arms, an axle mounted in the ends of said arms, pinions connected to said driving means, tractor wheels journaled on the ends of said axle, and an annular gear within each of said wheels in mesh with said pinions to receive a drive from said driving means.

6. In a tractor of the class described, a frame, a sleeve mounted thereon, arms journaled on said sleeve, driving mechanisms on the ends of said sleeve, pinions secured thereon, an axle supported by said arms, a spring suspension to support said frame upon the axle through said arms, tractor wheels journaled on said axle, an internal gear on each of said tractor wheels in mesh with said pinions, and a source of power on said frame connected to said driving mechanisms to transmit a drive through said pinions to said tractor wheels.

7. In a tractor of the class described, a frame, tractor wheels, an internal annular gear on each of said wheels, an axle on which said tractor wheels are journaled, arms supporting said axle pivotally connected to said frame to move through an arc with respect thereto, resilient means to support said frame upon said arms, a source of power on said frame, driving mechanisms connected with said arms, pinions secured thereon adapted to mesh with said internal annular gears in all positions of said tractor wheels, and means on said frame connecting said source of power with said driving mechanisms to transmit a drive through said pinions to said tractor wheels, said means adapted to drive each of said tractor wheels simultaneously in opposite directions with respect to the others.

8. In a device of the class described, a frame, internally geared tractor wheels, members connecting the same to said frame permitting an arc movement of said tractor wheels with respect to said frame, resilient means to support said frame on said members, pinioned driving mechanisms connected with said frame and members adapted to mesh with said internally geared tractor wheels at all times, means controlling said pinioned driving mechanisms to operate said tractor wheels in the same or in opposite directions with respect to one another, and a source of power on said frame adapted to transmit power to said pinioned driving mechanisms to drive said tractor wheels.

9. In a tractor of the class described, a frame, a power plant thereon, a single tractor wheel resiliently connected to the frame adapted to be moved out of its plane to steer the tractor, internally geared tractor wheels supporting the rear end of said frame, and mechanisms connected with said frame and power plant *en train* with said internally geared tractor wheels to transmit a drive from said power plant to said internally geared tractor wheels and reverse the drive to each of said internally geared tractor wheels independently of the other.

10. In a tractor of the class described, a frame, a power plant thereon, internally geared tractor wheels connected with said frame, pinions meshing with said internally geared tractor wheels, driving mechanisms connected with said power plant supporting said pinions, and means associated therewith adapted to drive said tractor wheels in opposite directions.

In testimony whereof we have hereunto subscribed our names in the presence of two subscribing witnesses.

ALBERT E. COOK.
THOMAS VAN TUYL.

Witnesses:
  Charles W. Hills, Jr.,
  Frank K. Hudson.